(12) United States Patent
Bernhard et al.

(10) Patent No.: US 7,793,753 B2
(45) Date of Patent: Sep. 14, 2010

(54) POWER-ASSISTED STEERING SYSTEM OR POWER STEERING SYSTEM

(75) Inventors: Werner Bernhard, Moegglingen (DE); Oliver Hetzel, Waldstetten (DE); Joachim Fischer, Schwaebisch Gmuend (DE); Olaf Beutler, Diepholz (DE); Achim Ottenstein, Durlangen (DE); Richard Kaisser, Waeschenbeuren (DE); Reinhold Schuster, Schechingen (DE); Wolf-Ingo Ratzel, Leinfelden-Echterdingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 723 days.

(21) Appl. No.: 10/576,064

(22) PCT Filed: Oct. 8, 2004

(86) PCT No.: PCT/EP2004/011241

§ 371 (c)(1),
(2), (4) Date: May 21, 2007

(87) PCT Pub. No.: WO2005/038303

PCT Pub. Date: Apr. 28, 2005

(65) Prior Publication Data

US 2007/0221438 A1   Sep. 27, 2007

(30) Foreign Application Priority Data

Oct. 15, 2003  (DE) ................ 103 47 780

(51) Int. Cl.
*B62D 5/04* (2006.01)

(52) U.S. Cl. ........................... 180/444; 74/445

(58) Field of Classification Search ............... 180/444; 74/DIG. 10, 445, 446, 461
See application file for complete search history.

(56) References Cited

U.S. PATENT DOCUMENTS 379,022 A * 3/1888 Morgan .................. 74/443

(Continued)

FOREIGN PATENT DOCUMENTS

GB     1 168 213     10/1969

(Continued)

OTHER PUBLICATIONS

International Search Report, PCT International Patent Application No. PCT/EP2004/011241, Jan. 27, 2005 (translated).

(Continued)

*Primary Examiner*—Tony H. Winner
(74) *Attorney, Agent, or Firm*—Kenyon & Kenyon LLP

(57) ABSTRACT

In a power-assisted steering system or power steering system having an electric motor, which drives a worm gear mechanism that has a composite gear wheel in the form of a worm wheel, the worm wheel includes a ring gear connectible to a hub via a first disk, and an annular projection of the first disk axially engages with the ring gear.

In order to improve the centering of the component parts of the composite gear wheel in the tangential direction, and in order to render the power transmission in the gear wheel uniform, the annular projection on the first disk is provided with one or more depressions in the axial direction to form tooth-like projections, which form a drive-type toothed section and engage with depressions on an axial side face of the ring gear.

10 Claims, 3 Drawing Sheets

U.S. PATENT DOCUMENTS

| | | | |
|---|---|---|---|
| 1,412,706 | A | 4/1922 | Pearce |
| 1,666,576 | A | 4/1928 | Lytle |
| 2,230,902 | A * | 2/1941 | Overbey ................. 74/448 |
| 2,923,166 | A | 2/1960 | Brindley et al. |
| 4,043,214 | A * | 8/1977 | Westlake ................. 474/162 |
| 4,946,427 | A | 8/1990 | Rampe |
| 5,452,622 | A * | 9/1995 | Fenelon ................. 74/411 |
| 6,497,041 | B2 * | 12/2002 | Fujita et al. ............. 29/893.35 |
| 2004/0060379 | A1 | 4/2004 | Bernhard et al. |

FOREIGN PATENT DOCUMENTS

| | | |
|---|---|---|
| GB | 1 571 628 | 7/1980 |
| GB | 2 070 189 | 9/1981 |
| JP | 2000-329217 | 11/2000 |
| JP | 2001-124181 | 5/2001 |
| WO | WO 01/44694 | 6/2001 |
| WO | WO 02/38432 | 5/2002 |

OTHER PUBLICATIONS

Written Opinion of the International Searching Authority, PCT International Patent Application No. PCT/EP2004/011241 (translation of Supplementary Pages provided).

International Preliminary Examination Report, PCT International Patent Application No. PCT/EP2004/011241, Nov. 29, 2005 (translation of Supplementary Pages and Annex provided).

* cited by examiner

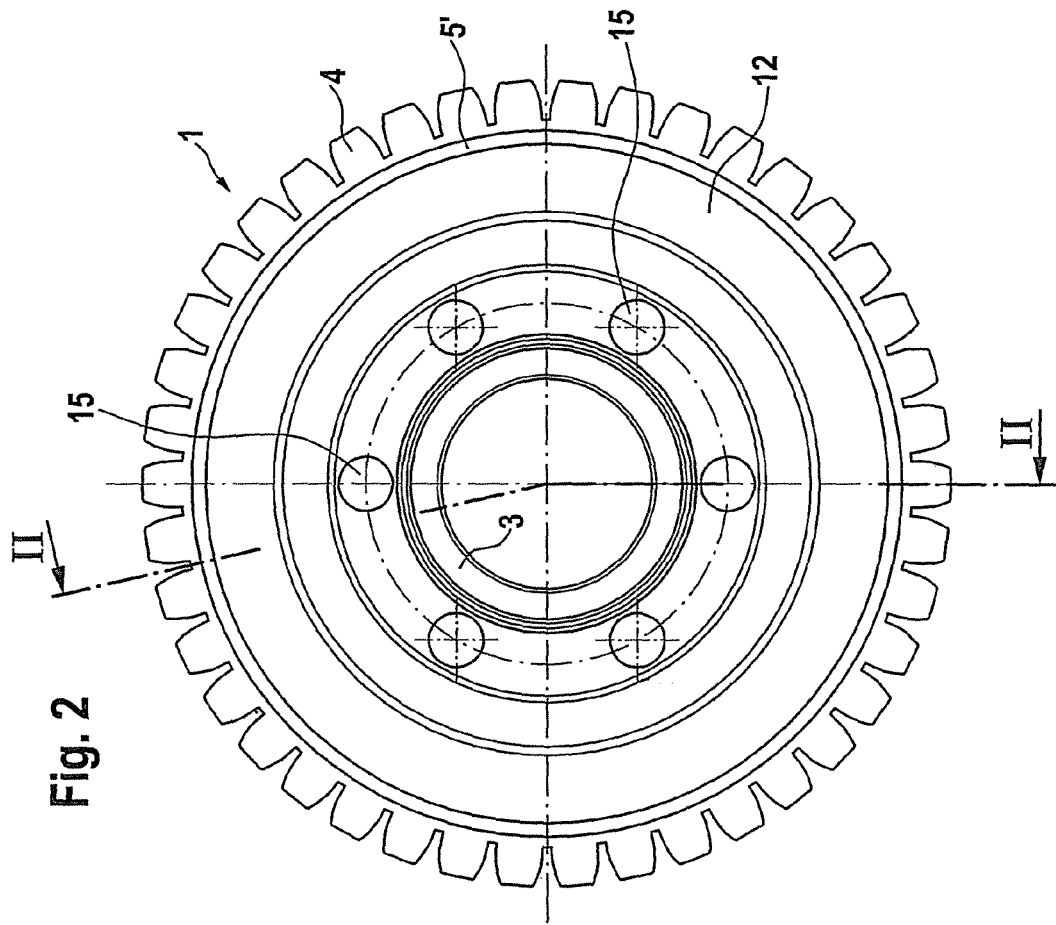
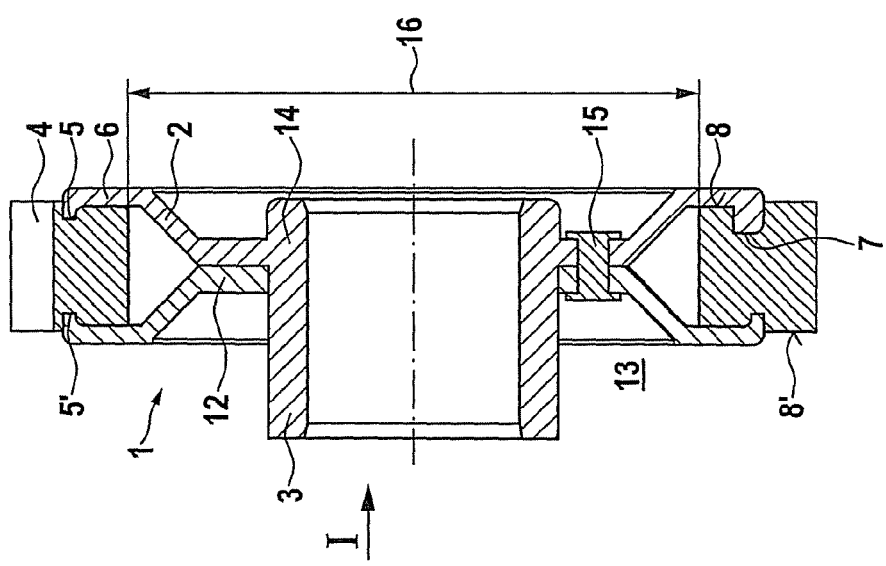

POWER-ASSISTED STEERING SYSTEM OR POWER STEERING SYSTEM

FIELD OF THE INVENTION

The present invention relates to a power-assisted steering system or power steering system.

BACKGROUND INFORMATION

In power-assisted steering systems or power steering systems having an electric motor, which drives a worm gear mechanism that includes a composite gear wheel, e.g., having a plastic ring gear, the composite gear wheel may ensure a high degree of running smoothness with high economic efficiency, when the worm gear mechanism has large dimensions and is paired with metallic wheels having a high degree of edge smoothness. Composite gear wheels are conventional.

PCT International Published Patent Application No. WO 01/44694 describes a composite gear wheel, which is suitable for a worm gear mechanism of a power-assisted steering system or power steering system, having a two-piece ring gear that is screwed onto a hub. The hub has an annular flange on one axial end. The ring gear is form-locked to the hub by a disk, which is positioned in the axial direction of the composite gear wheel, on the opposite side of the annular flange. Both the disk and the annular flange of the hub have an annular projection, which, in each instance, engages with an annular groove on the side faces of the ring gear in the axial direction of the composite gear wheel and secures the ring gear in the radial direction.

To transmit the torque from the ring gear to the hub or vice versa, threaded bolts are guided through the disk, the ring gear, and the annular flange of the hub. The individual component parts and, in particular, the threaded bolts are not self-centering, which is why the power transmission in the composite gear wheel and the assembly sequence of the composite gear wheel are not optimized.

SUMMARY

Example embodiments of the present invention may provide a composite gear wheel for power-assisted steering systems or power steering systems having an electric motor that drives a worm gear mechanism, so that the assembly of the gear wheel may be simplified and the power transmission in the composite gear wheel may be uniform.

In power-assisted steering systems or power steering systems having an electric motor that drives a worm gear mechanism, a composite gear wheel may be provided having the features described herein.

Since the annular, axial projection of the disk has a depression in the axial direction and a keyed connection in the tangential direction is rendered possible at an axial side face of the ring gear by a projection and by a depression, a centering aid which may allow simple, rapid assembly of the composite gear wheel may be provided in the tangential direction between the disk and the ring gear. For example, when a plurality of depressions are provided, it may be possible to achieve uniform torque transmission between the hub, disk, and ring gear, distributed over the circumference of the disk.

The keyed connection between the disk and the ring gear may be provided by projections and depressions on the disk, and by complementary projections and depressions in the side face of the ring gear in, in each instance, the axial direction of the composite gear wheel. The depressions and projections form a drive-type toothed section in the tangential direction. It may be provided that the projections and depressions are block-shaped and are positioned about the circumference of the disks and the ring gear, in that the depressions rectangularly pass through the originally annular, axial projection on the circumference of the disk in a radial direction. The depressions may also pass through the annular, axial projection, having curved edges. The disk may be formed in one piece with the hub or suitably fastened to the hub in a form-locked or force-locked manner. The ring gear may be axially fixed between two disks and fastened to the hub by them in a rotatably fixed manner. The shape, cross-sectional shape, and the inner and outer diameters of the second disk may be similar to or the same as those of the first disk. The second disk has an annular, axial projection, which is interrupted by one or more depressions and is directed toward an axial side face of the ring gear.

The shape and the number of depressions and projections on the second disk and the side face of the ring gear may be the same as on the first disk and on its complementary side face of the ring gear. They may be conically interlocking.

The second disk may be connected to the ring gear and/or to the first disk fastened to the hub, using rivets or threaded bolts or friction welding.

The arrangement of the composite gear wheel may be suitable for making the ring gear out of a thermoplastic or duroplastic synthetic material. The composite gear wheel may be capable of producing a low-noise gear unit of a power-steering system or power-assisted steering system of a vehicle, and, e.g., as a worm wheel of a steer-by-wire system.

Example embodiments of present invention are described in more detail below with reference to the appended Figures.

BRIEF DESCRIPTION OF THE DRAWINGS

FIG. 1 is a longitudinal cross-sectional view of a composite gear wheel take along line II-II illustrated in FIG. 2.

FIG. 2 illustrates a composite gear wheel in arrow direction I illustrated in FIG. 1.

DETAILED DESCRIPTION

Figure 3:
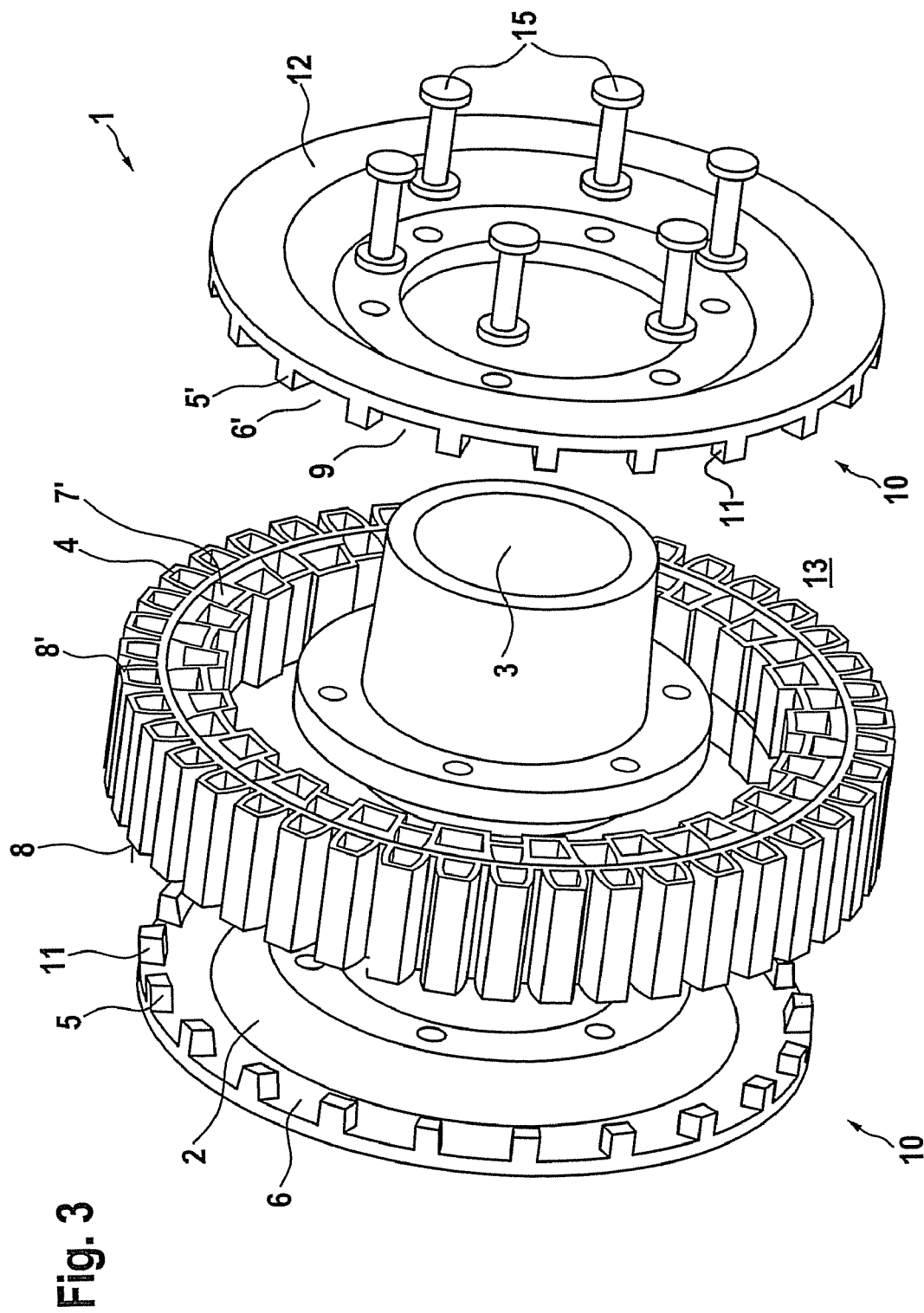
FIG. 3 is an exploded view of a further composite gear wheel.

Illustrated in the Figures is a composite gear wheel, as is used in a worm gear mechanism for power-assisted steering systems or power-steering systems, where the gear wheel is used as a worm wheel that engages with a worm or worm gear, in order to provide steering assistance or to produce the entire required steering force.

FIG. 1 is a longitudinal cross-sectional view of a composite gear wheel 1 taken along line II-II illustrated in FIG. 2. Composite gear wheel 1 includes: a cylindrical hub 3, on whose one axial end 14 a first disk 2 having a crimped cross-section is formed in one piece; of an annular ring gear 4; and a second disk 12. Ring gear 4 is made of a thermoplastic synthetic material. First and second disks 2, 12 terminate ring gear 4 in the axial direction and are pressed against it with the aid of six rivets 15, which pass through disks 2, 12 and ring gear 4. Hub 3 and first and second disks 2, 12 are made of metal.

On their outer circumferential edges, the two disks 2, 12 have an annular projection 5, 5' facing ring gear 4 in the axial direction. Annular projections 5, 5' are interrupted by depressions 6, 6', which have a rectangular cross-section when viewed in the radial direction of disks 2, 12 (cf. FIG. 3).

In the composite state of composite gear wheel 1, tooth-like projections 5, 5' formed in this manner extend into depressions 7, 7' on axial side faces 8, 8' of ring gear 4. In this manner, a keyed connection with ring gear 4 is produced in the radial and tangential directions of disks 2, 12. Depressions 7, 7' and projections 5, 5' may be formed comically with respect to each other, which may simplify the assembly of composite gear wheel 1. Depressions 6, 6' on disks 2, 12 are positioned at the same tangential distance 9 from each other and form a drive-type toothed section 10, which points in the axial direction toward ring gear 4, at the outer circumferential edge of disks 2, 12. Instead of in a conically even manner, edges 11 of projections 5, 5' may also extend toward depressions 7, 7' in a conically curved manner.

As illustrated by FIG. 2 in a plan view of assembled gear wheel 1 in arrow direction I illustrated in FIG. 1, and as illustrated by FIG. 3 in an exploded view of a further assembled gear wheel 1, rivets 15 are positioned axially symmetrically with respect to each other in the radial direction in the vicinity of the hub and are mounted flush with the outer contour of disks 2, 12. Ring gear 4 has straight-cut teeth. Inner diameter 16 of ring gear 4 extends into the disk support, which means that elastic, radial and axial expansion of plastic ring gear 4 caused by, for example, water absorption or the effect of temperature may occur without acting on the connecting points of rivets 15.

In contrast to gear wheel 1 illustrated in FIGS. 1 and 2, gear wheel 1 illustrated in FIG. 3 includes a hub 3, two disks 2, 12, and a ring gear 4, which means that hub 3 and disks 2, 12 represented separate component parts to be connected in a form-locked manner.

Figure 4:
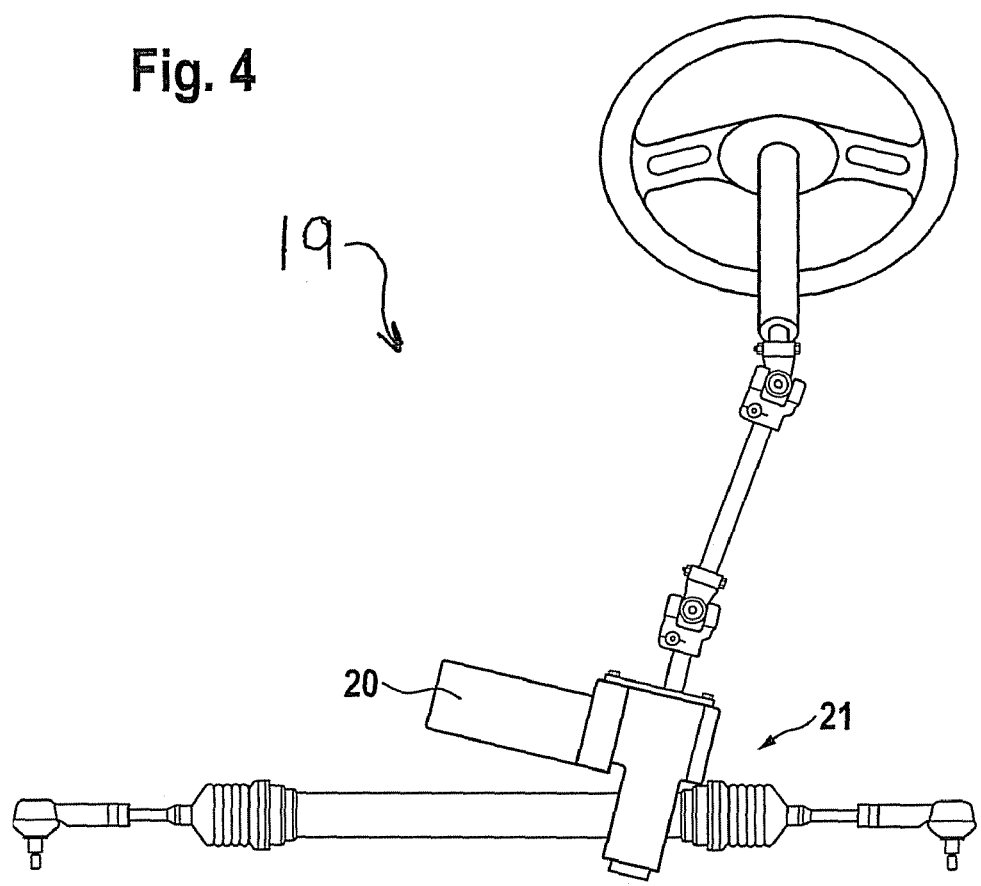
FIG. 4 illustrates a steering system that includes an electric motor and a worm gear mechanism 21.
Figure 5:
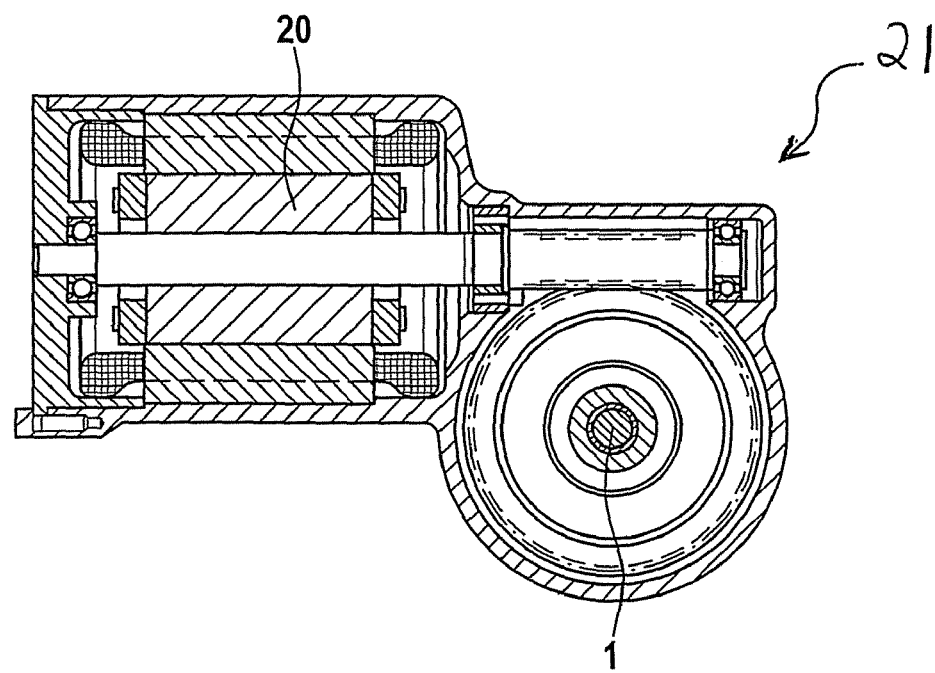
FIG. 5 includes a cross-sectional view of the electric motor and the worm gear mechanism of FIG. 4.

FIG. 4 illustrates a steering system 19 that includes an electric motor 20 and a worm gear mechanism 21. The steering system 19 may be a power-assisted steering system or a power steering system. In addition, FIG. 5 includes a cross-sectional view of the electric motor 20 and the worm gear mechanism 21 of FIG. 4, the worm gear mechanism 21 including the composite gear wheel 1.

What is claimed is:

1. A steering system arranged as one of a power-assisted steering system and a power steering system, comprising:

a worm gear mechanism including a composite gear wheel arranged as a worm wheel and engages a worm, the worm wheel including a ring gear connectible to a hub by a first disk, an annular projection of the first disk axially engaging with the ring gear, the annular projection including a depression in an axial direction, one of (a) the projection engaging in a form-locked manner with a depression on an axial side face of the ring gear and (b) an axial projection on the axial side face of the ring gear engaging with the depression of the first disk; and an electric motor arranged to drive the worm gear mechanism;

wherein a second disk is arranged on a side opposite the first disk in the axial direction of the ring gear;

wherein the second disk engages in a form-locked manner with an annular projection of a second axial side face of the ring gear; and wherein at least one of (a) a number and (b) a shape of depressions on the second disk are approximately the same as on the first disk.

2. The steering system according to claim 1, wherein a plurality of depressions are arranged on the annular projection of the first disk in a circumferential direction of the first disk.

3. The steering system according to claim 2, wherein the plurality of depressions are spaced apart from each other by a same distance and form a drive toothed section.

4. The steering system according to claim 1, where the depression passes through the annular projection in a radial direction of the first disk.

5. The steering system according to claim 1, wherein the depression passes through the annular projection in a radial direction of the first disk forming curved edges.

6. The steering system according to claim 1, wherein the first disk is formed in one piece with the hub.

7. The steering system according to claim 1, wherein the second disk is one of (a) screwed and (b) riveted to at least one of (a) the hub and (b) the first disk.

8. The steering system according to claim 1, wherein the second disk is connected to at least one of (a) the hub and (b) the first disk by friction-welding.

9. The steering system according to claim 1, wherein the ring gear is formed of one of (a) a thermoplastic and (b) a duroplastic synthetic material.

10. The steering system according to claim 1, wherein the composite gear wheel is part of one of (a) a power-assisted steering system and (b) a power steering system of a vehicle.

* * * * *